United States Patent [19]
ter Haar

[11] Patent Number: 5,274,906
[45] Date of Patent: Jan. 4, 1994

[54] OIL FILTER SHEAR AND CRUSHER

[75] Inventor: Andre J. ter Haar, Clearwater, Fla.

[73] Assignee: T.W.L. Industries Incorporated, Tampa, Fla.

[21] Appl. No.: 983,373

[22] Filed: Nov. 30, 1992

[51] Int. Cl.$^5$ .............................................. B23P 19/00
[52] U.S. Cl. .................................... 29/700; 29/426.4; 100/902; 83/856; 83/946
[58] Field of Search ................ 29/426.2, 426.4, 420.5, 29/700, 33; 100/902; 241/99; 83/946, 54, 856

[56] References Cited

U.S. PATENT DOCUMENTS 4,418,460 12/1983 Ruth .................................. 29/426.4
5,182,842 2/1993 Ross et al. .......................... 100/902

Primary Examiner—Mark Rosenbaum
Assistant Examiner—David P. Bryant
Attorney, Agent, or Firm—Harold D. Shall

[57] ABSTRACT

A container for a vertically disposed oil filter with its connector plate positioned downwardly. A pushing member for pushing the filter horizontally across a shearing member for shearing the connector plate off of the filter. The pushing member further pushing the filter horizontally against the back wall of the container thereby compressing the filter and the oil from the filter, the connector plate and the compressed filter falling through an opening in the container into a receptacle.

4 Claims, 2 Drawing Sheets

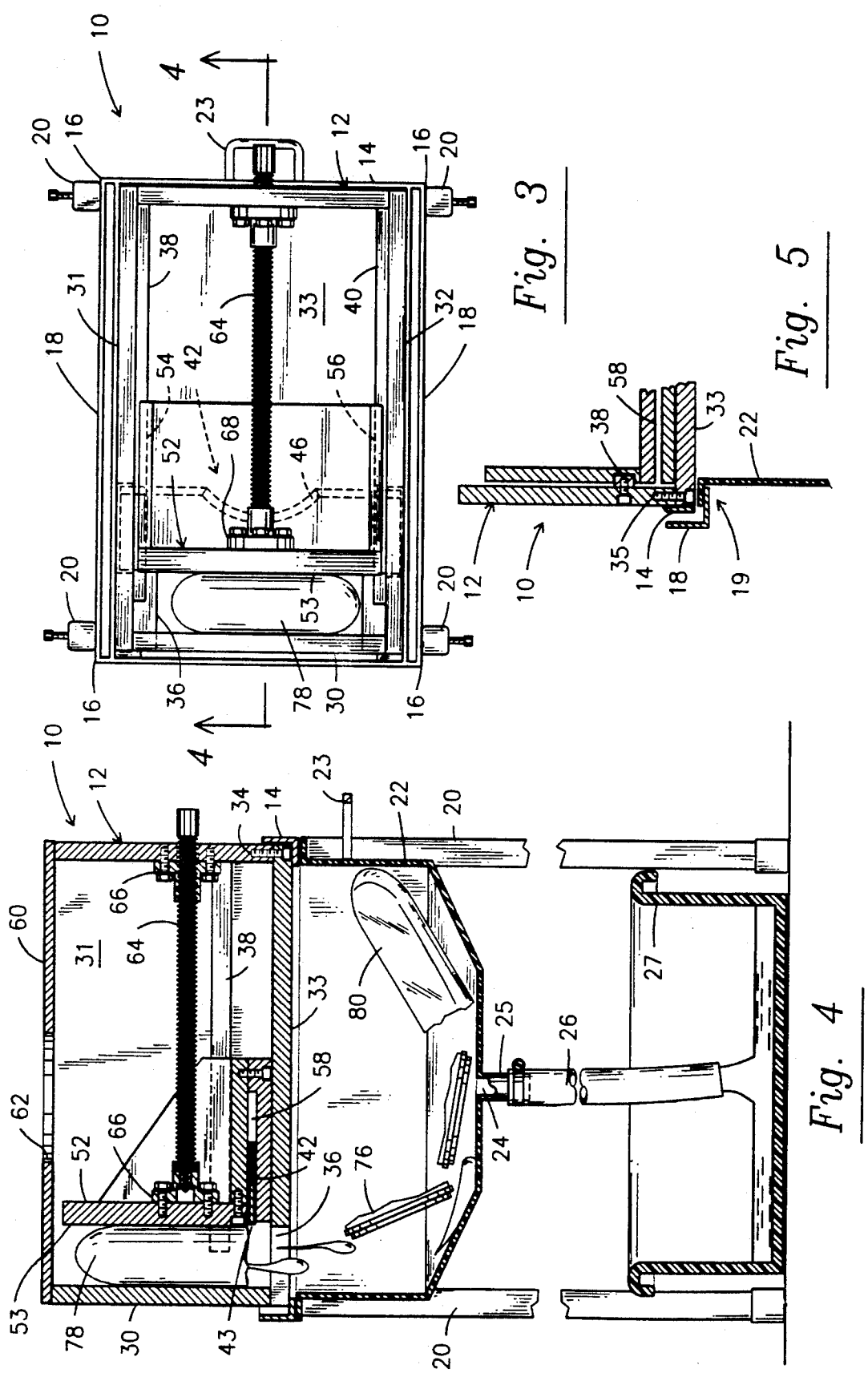

5,274,906

OIL FILTER SHEAR AND CRUSHER

BACKGROUND OF THE INVENTION

1. Field of the Invention

This invention relates to oil filter compactors generally and more particularly to a device which shears the connector plate off the end of the oil filter while simultaneously crushing the oil filter in a horizontal direction thereby allowing substantially all the oil in the filter to be recovered for recycling and allowing the filter housing itself to become a recyclable product.

2. Description of the Prior Art

Oil filter draining devices normally compact the oil filter vertically along its longitudinal axis without first removing the connector plate from the end of the filter so that a substantial amount of oil remains in the compacted filter and the filter housing is not suitable for recycling. U.S. Pat. No. 4,396,340 shows a can opener and crusher, however, that merely places one end of the can over a knife edge, forces the can over the knife edge to penetrate the same and drain the contents from the can and then compresses the can vertically in a separate operation.

SUMMARY OF THE INVENTION

Accordingly, it is an object of this invention to provide an oil filter shear and crusher which provides for substantially complete drainage of oil from the filter.

It is another object of this invention to provide an oil filter shear and crusher which severs the connector plate from the main body of the oil filter by shearing and while shearing, crushes the filter to a compact thickness.

It is a further object of this invention to provide a container for an oil filter disposed in a vertical position with its connector plate downwardly, pushes horizontally on the filter with a pusher assembly across a shearing device which shears the connector plate from the end of the filter, continue pushing the filter with the pusher assembly against a back plate thereby crushing the filter horizontally to a compact thickness, and retracting the pusher assembly thereby allowing the severed connector plate and crushed filter housing to fall into a collector container while the oil from the filter drains into the collector container for recycling.

BRIEF DESCRIPTION OF THE DRAWINGS

FIG. 3 is a plan view like FIG. 1 in a different operative position;

FIG. 4 is a cross sectional view taken along the lines 4—4 in FIG. 3 with the cover in place; and FIG. 5 is a cross sectional view taken along lines 5—5 in FIG. 1.

DETAILED DESCRIPTION OF THE INVENTION

Figure 1:
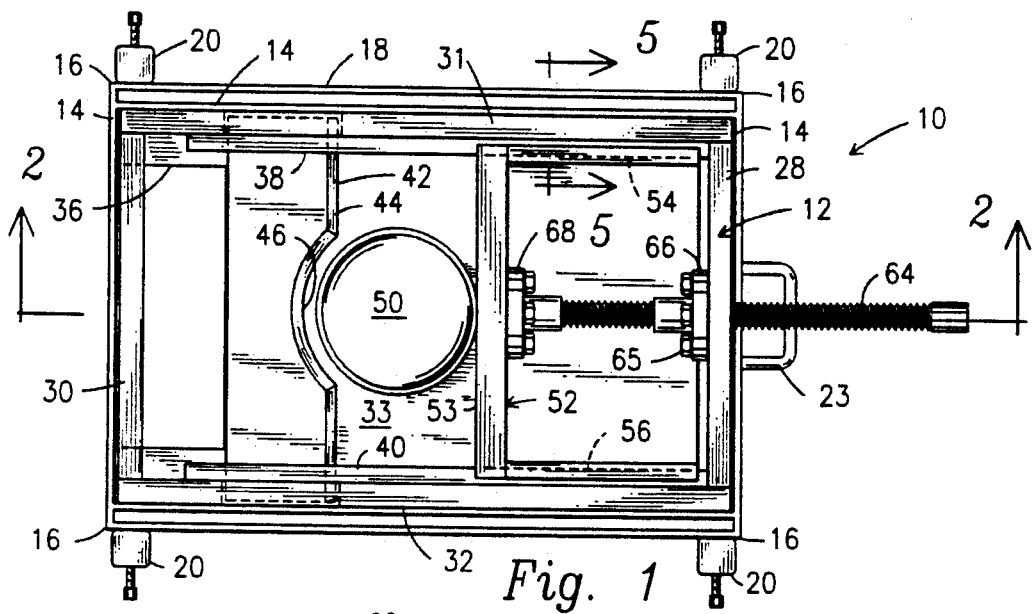
FIG. 1 is a plan view of a device embodying this invention with the c omitted for added clarity.
Figure 2:
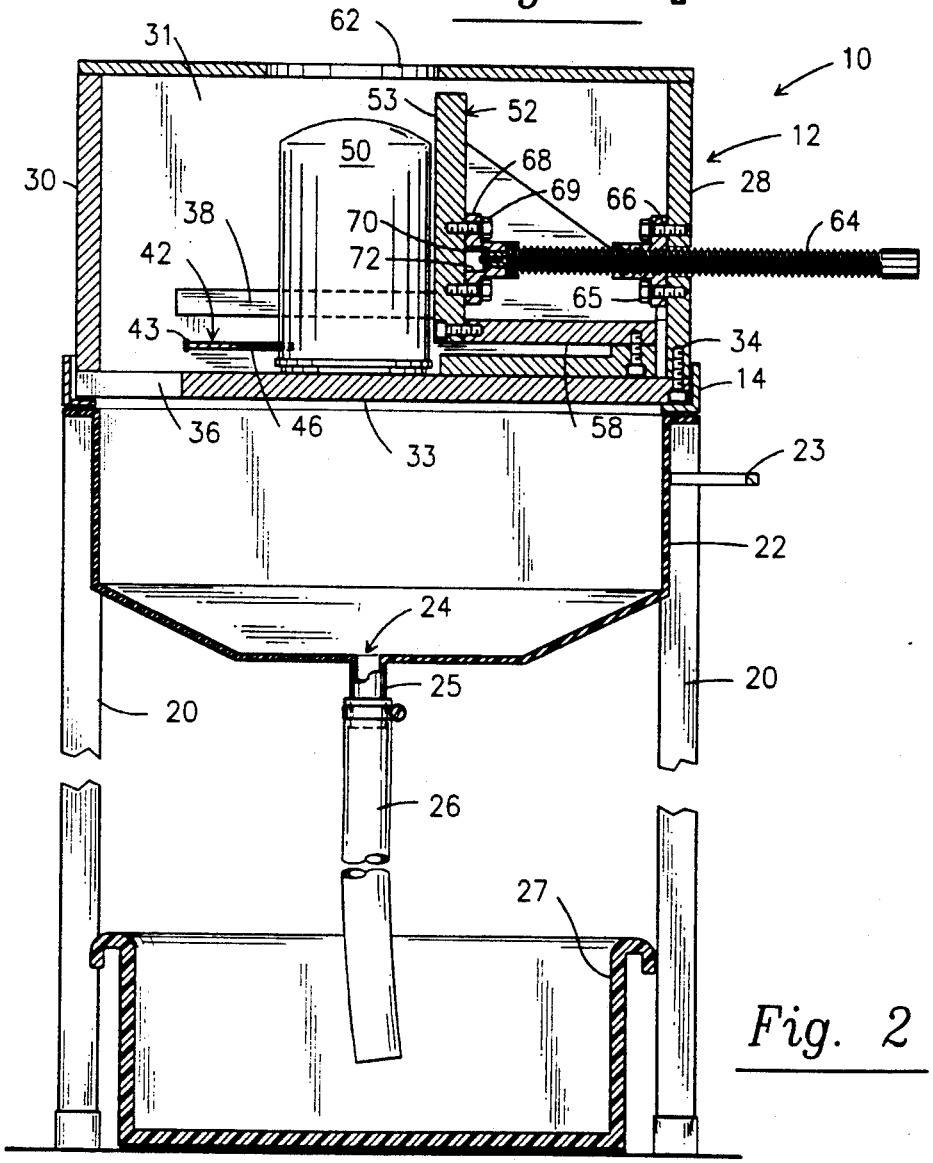
FIG. 2 is a cross sectional view taken along the lines 2—2 in FIG. 1 with the cover in place.

Referring now to the drawings and more particularly to FIGS. 1, 2 and 5, an oil filter shear and crusher is shown generally at 10. The crusher 10 includes a box like member 12 which is supported by an inner angle iron frame 14 which in turn is welded at its four corners 16 to an outer angle iron frame 18. The outer angle iron frame has bolted thereto four legs 20 which supports the frame 14 and the box like member 12 above the floor. The outer angle iron frame 18 (see FIG. 5) has an inturned flange 19 upon which slides a drawer receptacle 22 having a handle 23 at its right end. The drawer receptacle 22 is positioned below the box like member 12 and receives the draining oil and sheared and crushed oil filter (as hereinafter described) and has a drain opening 24 in a line 25 in the bottom thereof through which the oil from the filter drains. Secured to the line 25 is a hose 26 which leads to an oil collecting container 27.

While the box like member 12 is shown as being supported on the frame 14, it can be adapted for wall mounting instead of being supported above the floor by the legs 20.

The box like member 12 includes a rear vertical wall 30 interconnected by a pair of spaced side vertical walls 31 and 32. The box like member 12 also has a bottom wall 33 which is connected to the vertical walls 28, 30, 31 and 32 by a plurality of bolts, one of which being shown at 34 in FIGS. 2 and 4 and another of which is shown at 35 in FIG. 5. The bottom wall 33 is provided at its left end with an opening 36 through which draining oil, the sheared plate of the filter and the compressed filter can fall into the receptacle 22 below.

A track shoulder 38 is attached to the inner side of wall 31 spaced above the bottom wall 33 and a parallel track shoulder 40 is attached to the inner side of wall 32 likewise spaced above the bottom wall 33. A shearing plate 42 is securely attached to the walls 31 and 32 with the left side 43 thereof terminating at the start of the opening 36 and the right side 44 thereof extending to the right therefrom. The right side 44 of the shear plate 42 has a concave sharpened slot 46 positioned medially therein, which slot 46 is positioned immediately to the left of an oil filter 50, shown in FIGS. 1 and 2 which has just been placed in the shear crusher 10 to be operated upon.

As seen in FIGS. 1 and 2, a pusher member 52 is positioned in the box 12 in its withdrawn position with the left face 53 thereof immediately to the right of the oil filter 50. The pusher member 52 has a pair of longitudinal grooves 54 and 56 therein which are slidingly mounted on the registering track shoulders 38 and 40, respectively. The pusher member 52 rides on the shoulders 38 and 40, while the bottom of the member 52 rests on the bottom wall 33 as the member 52 moves back and forth in the box 12. A shear plate receiving slot 58 is formed in the left side of the member 52 and projects to the right sufficiently to receive the shear plate within the same when the member 52 is moved to its extreme leftward position. A removable cover 60 is provided for the box 12 and has a medial opening 62 therein, into which opening an oil filter 50 may be dropped, when the pusher member 52 is in its right position, to assume the filter position shown in FIGS. 1 and 2 ready to be sheared and crushed.

A pusher and retractor means in the form of a screw threaded member 64 is provided for moving the pusher member 52 back and forth in the box 12. More particularly, the screw threaded member 64 is mounted in an internally threaded flange 66 bolted to the rear wall 28, by a plurality of bolts 65 and extends to and its left end is rotatably mounted in a flange 68 secured to the right side of pusher 58 by a plurality of bolts 69. A thrust washer 70 is bolted to the left end of screw member 64 and is received in a counter bore 72 in the flange 68 whereby rotation of the screw member 64 in a clockwise direction (as seen in FIG. 2) will advance the pusher member 52 to the left, while rotation of the screw member oppositely will retract the pusher member. The pusher member may be rotated manually with a wrench or power driven by an air wrench operating on its right end. It is also understood that the screw threads could be omitted and the member 64 could be advanced and withdrawn by other well known means such as a hydraulic cylinder.

FIG. 4 shows the pusher member 52 having forced the oil filter to the left where the connector plate 76 has been sheared from the bottom of the remainder of the partially compressed filter 78 and shows a fully compressed filter at 80. Once the filter 80 is fully compressed or crushed, substantially all the oil is out of the same and the oil may be collected for recycling and the filter 80 and severed connector plate 76 are ready for recycling.

It should be apparent to those skilled in the art that various change in form and details of the invention as shown and described may be made. It is contemplated that such changes be included within the spirit and scope of the invention as claimed herein.

What is claimed is:

1. An oil filter shear and crusher for shearing a connector plate of an oil filter off the end of an oil filter housing and compressing the oil filter housing comprising;
    a) a container means having front and back walls, a pair of side walls and a bottom wall,
    b) a pusher means disposed within said container means and moveable between a first position spaced from said back wall and a second position close to said back wall,
    c) an opening means formed in said bottom wall adjacent said back wall,
    d) a shearing member carried by said side walls and extending therebetween and being located between said opening means and said pusher means when the latter is at said first position, said shearing member being spaced closely to said bottom wall and being operative to shear the connector plate off of an oil filter placed within said shear and crusher,
    e) container means disposed below said opening means to collect items falling through said opening means, and
    f) advancing and retracting means extending through said front wall and connected to said pusher means for moving said pusher means between said first and second positions wherein, upon movement of said pushing means between said first and second positions, ann oil filter positioned between said pusher means and said shearing member will having the connector plate sheared off of the end of the oil filter, and, subsequently said pusher means will compress said oil filter housing between said pusher means and said back wall, said advancing and retracting means being operative to return said pusher means from said back wall.

2. A device according to claim 1 wherein said pusher means has an opening therein for receiving said shearing member.

3. An oil filter shear and crusher for shearing the connector plate of an oil filter off the end of an oil-containing oil filter housing and compressing said housing comprising,
    a) a shearing member configured and positioned to shear the connector plate of an oil filter pushed thereagainst,
    b) means for positioning said oil filter vertically in front of said shearing member,
    c) wall means positioned behind said shearing member and operative to have said oil filter housing compressed and flattened thereagainst,
    d) an opening means between said shearing member and said wall means, and
    e) pushing means for pushing an oil filter horizontally across aid shearing member thereby shearing the connector plate off the oil filter and for compressing the oil filter housing against said wall means, said pushing means being retractable thereafter, the oil in the oil filter housing being squeezed out and draining into said opening means and the compressed oil filter housing dropping into said opening means upon retraction of said pushing means.

4. A device according to claim 3 wherein said pushing means has an opening therein for receiving said shearing member.

* * * * *